United States Patent
Cho et al.

(10) Patent No.: US 9,100,148 B2
(45) Date of Patent: Aug. 4, 2015

(54) METHOD AND APPARATUS FOR DYNAMICALLY ALLOCATING RESOURCE

(71) Applicant: Electronics and Telecommunications Research Institute, Daejeon (KR)

(72) Inventors: Yunhee Cho, Daejeon (KR); Jae Su Song, Daejeon (KR); Seok Seo, Daejeon (KR); Seung-Hwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/090,756

(22) Filed: Nov. 26, 2013

(65) Prior Publication Data
US 2014/0295866 A1 Oct. 2, 2014

(30) Foreign Application Priority Data
Mar. 28, 2013 (KR) .......... 10-2013-0033584

(51) Int. Cl.
| | |
|---|---|
| H04W 72/00 | (2009.01) |
| H04L 5/00 | (2006.01) |
| H04W 24/00 | (2009.01) |
| H04W 28/08 | (2009.01) |
| H04B 7/26 | (2006.01) |

(52) U.S. Cl.
CPC .............. *H04L 5/003* (2013.01); *H04W 24/00* (2013.01); *H04B 7/2643* (2013.01); *H04W 28/08* (2013.01)

(58) Field of Classification Search
CPC ..... H04W 24/00; H04W 28/04; H04W 28/08; H04B 7/2643
USPC ............. 455/452.1, 452.2, 453; 370/337
See application file for complete search history.

(56) References Cited

U.S. PATENT DOCUMENTS

| | | | | |
|---|---|---|---|---|
| 7,039,358 | B1 * | 5/2006 | Shellhammer et al. | 455/41.2 |
| 7,796,567 | B2 | 9/2010 | Yang | |
| 2002/0075829 | A1 * | 6/2002 | Sakoda | 370/332 |
| 2006/0068831 | A1 * | 3/2006 | Stewart et al. | 455/522 |
| 2006/0083198 | A1 * | 4/2006 | Eidenschink et al. | 370/329 |
| 2008/0112350 | A1 * | 5/2008 | Nanda et al. | 370/312 |
| 2010/0195633 | A1 * | 8/2010 | Vare et al. | 370/338 |
| 2011/0070911 | A1 | 3/2011 | Zhang et al. | |
| 2011/0103365 | A1 | 5/2011 | Sankaran et al. | |

(Continued)

FOREIGN PATENT DOCUMENTS

| | | |
|---|---|---|
| EP | 2079257 A1 | 7/2009 |
| KR | 10-2008-0086595 A | 9/2008 |

*Primary Examiner* — Danh Le
(74) *Attorney, Agent, or Firm* — Rabin & Berdo, P.C.

(57) ABSTRACT

A dynamic resource allocating apparatus of a first base station that manages a first cell in a cellular communication system including the first cell and a plurality of cells adjacent to the first cell determines time resource division vector in which one time resource division period is formed of a plurality of time division intervals and calculates time resource division vector for maximizing utilities of user terminals in a set up objective function to update the time resource division vector. Among the plurality of time division intervals, a first time division interval is operated by a time resource reuse coefficient 1 for user terminals positioned in center regions of a first cell and a plurality of adjacent cells, and the remaining time division intervals excluding the first time division interval are operated by a time resource reuse coefficient n for user terminals positioned at edges of the first cell and the plurality of adjacent cells.

12 Claims, 10 Drawing Sheets

(56) References Cited

U.S. PATENT DOCUMENTS

| | | | |
|---|---|---|---|
| 2012/0257686 A1* | 10/2012 | Scholand | 375/295 |
| 2012/0327894 A1* | 12/2012 | Axmon et al. | 370/330 |
| 2015/0085731 A1* | 3/2015 | Jiang et al. | 370/311 |

* cited by examiner (a) $\beta_0$  (b) $\beta_1$ (c) $\beta_2$  (d) $\beta_3$ (a)

(b)

(c)

METHOD AND APPARATUS FOR DYNAMICALLY ALLOCATING RESOURCE

CROSS-REFERENCE TO RELATED APPLICATION

This application claims priority to and the benefit of Korean Patent Application No. 10-2013-0033584 filed in the Korean Intellectual Property Office on Mar. 28, 3013, the entire contents of which are incorporated herein by reference.

BACKGROUND OF THE INVENTION (a) Field of the Invention

The present invention relates to a method and an apparatus for dynamically allocating a resource. More particularly, the present invention relates to a method and an apparatus for allocating a resource to control inter-cell interference in a wireless communication system including a plurality of cells.

(b) Description of the Related Art

In general, in a wireless communication system, in order to increase capacity of the system, an entire service area is divided into a plurality of cells to form a multi-cell. In each cell, a base station for providing a service to a terminal positioned in the cell is provided.

In such a cellular system, in order to increase the capacity of the system, frequency use efficiency must be maximized. For this purpose, cells are designed to commonly use an entire frequency band. When adjacent cells use the same frequency band, since a sub-channel formed of an orthogonal frequency is allocated to each user, there is no interference in one cell, however, interference is generated between cells. The above phenomenon is referred to as inter-cell interference.

Particularly, in terminals positioned in a center region of a cell, since intensity of a signal received from another cell is small and that of a signal received from a serving cell is large, the inter-cell interference does not significantly matter. However, in terminals positioned in a cell edge of the cell, since intensity of a signal received from an adjacent cell is large and that of the signal received from the serving cell is small, the inter-cell interference significantly deteriorates communication performance.

In order to prevent the communication performance of the terminals positioned in the cell edge of the cell from being deteriorated, in a conventional art, a fractional frequency reuse (FFR) technique is suggested.

In the FFR technique for allocating a resource to remove the inter-cell interference in a frequency region, a cell is divided into a center region and a cell edge and a frequency reuse factor of terminals positioned in the center region is set up to be different from that of terminals positioned in the cell edge. However, since a frequency use band of the terminals positioned in the center region and the edge cell is limited in the FFR technique, there is a drawback in that a frequency selective gain is limited. For example, when deep fading occurs in the terminals positioned in the cell edge in an allocated frequency sub-band, performance of the terminals is severely deteriorated. In addition, in the cell edge region, due to a large reuse factor, entire spectral efficiency is limited.

A fractional time reuse (FTR) technique for controlling interference through time scheduling coordination among base stations is suggested as a solution for the problem of the FFR technique.

In the FTR technique, a cell is divided into a center region and a cell edge, and all base stations serve terminals using an entire frequency band in all time slots in the center region and only one base station between adjacent base stations serves the terminals using the entire frequency band in an allocated specific time slot in the cell edge. In the FTR technique, a frequency selective gain is provided to the terminals positioned in the center region and the cell edge of the cell so that performance of the terminals may be improved.

However, such interference coordination using the static FFR and FTR techniques is not adaptive to changes in user distribution of the system and a load level of a base station.

SUMMARY OF THE INVENTION

An object of the present invention is to provide a method and an apparatus for dynamically allocating a resource that is capable of adaptively controlling inter-cell interference in accordance with changes in user distribution and a load level of a base station to improve performance of terminals positioned in a cell.

According to an exemplary embodiment of the present invention, a method of allocating time resource by a resource allocating apparatus of a cellular communication system including a plurality of cells is provided. The method includes dividing a time resource of one period into a first time division interval and a second time division interval, dividing the second time division interval into a plurality of third division intervals, and setting up a first level of transmission power in cells to which corresponding third division intervals are allocated to be no less than a second level of transmission power in other cells in the third division intervals. Magnitudes of the first time division interval and the plurality of third division intervals are changed in accordance with distribution of user terminals of the plurality of cells and load levels of the plurality of cells.

Base stations of the respective cells serve user terminals positioned in centers of corresponding cells in the first time division interval and serve user terminals positioned at edges of the corresponding cells in the allocated third division intervals.

The plurality of cells are divided into a plurality of cell types, and the plurality of third division intervals are allocated to base stations of the plurality of cell types.

Setting up a first level of transmission power in cells to which corresponding third division intervals are allocated to be no less than a second level of transmission power in other cells in the third division intervals includes setting up a third level of transmission power in the plurality of cells to be no more than the first level and no less than the second level in the first time division interval.

The first level is set up so that signal quality of no less than a first threshold value is provided to the user terminals positioned at the edges of the corresponding cells in the allocated third division intervals. The second level is set up so that interference of no more than a second threshold value is generated in user terminals positioned at edges of adjacent cells. The third level is set up so that signal quality of no less than the first threshold value is provided to the user terminals positioned in the centers of the corresponding cells.

According to another exemplary embodiment of the present invention, there is provided a method of allocating time resource by a dynamic resource allocating apparatus of a first base station that manages a first cell in a cellular communication system including the first cell and a plurality of cells adjacent to the first cell. The dynamic resource allocating method includes dividing a time resource of one period into a first time division interval and a second time division interval and dividing the second time division interval into a plurality of third division intervals, setting up a first level of transmission power in cells to which corresponding third division intervals are allocated to be no less than a second level of transmission power in other cells in the third division intervals, determining time resource division vector that represent the first time division interval and the plurality of third division intervals, and changing the time resource division vector in accordance with distribution of user terminals of the first cell and the plurality of adjacent cells and load levels of the first cell and the plurality of adjacent cells after the one period.

The dynamic resource allocating method further includes the first base station and a plurality of adjacent base stations that manage the plurality of adjacent cells serving user terminals positioned in centers of cells in the first time division interval, and the first base station and the plurality of adjacent base stations serving user terminals positioned at edges of the cells in the allocated third division intervals. The plurality of first cells and the plurality of adjacent cells are divided into a plurality of cell types, and the plurality of third division intervals are allocated to base stations of the plurality of cell types.

Setting up a first level of transmission power in cells to which corresponding third division intervals are allocated to be no less than a second level of transmission power in other cells in the third division intervals includes setting up a third level of transmission power in the plurality of cells to be no more than the first level and no less than the second level in the first time division interval.

The dynamic resource allocating method further includes selecting user terminals of the first cell in which sub-channels are to be used in the one period.

Selecting user terminals of the first cell in which sub-channels are to be used in the one period includes calculating an achievable rate of the user terminals of the first cell in the sub-channels of the first time division interval and the plurality of third division intervals, and selecting user terminals in which the sub-channels are to be used in accordance with the achievable rate of the user terminals of the first cell calculated by the sub-channels.

Calculating the achievable rate includes receiving channel quality information from the user terminals of the first cell and calculating the achievable rate information based on the channel quality information received from the user terminals of the first cell.

In changing the time resource division vector, an objective function that maximizes user utilities of the user terminals of the first cell is used, and the user utility values vary with the distribution of user terminals of the first cell and the plurality of adjacent cells and the load levels of the first cell and the plurality of adjacent cells.

The objective function includes at least one of an objective function for minimizing data throughput, an objective function for guaranteeing a minimum transmission speed, and an objective function in which a delay value is used as a performance ratio.

Changing the time resource division vector includes calculating an average gradient descent direction of the user utilities of the user terminals of the first cell for the first time division interval and the plurality of third division intervals, receiving the average gradient descent direction of the user utilities calculated by the plurality of adjacent base stations for the first time division interval and the plurality of third division intervals from the plurality of adjacent base stations, respectively, and changing the first time division interval and the plurality of third division intervals using the average gradient descent direction calculated by the first base station and the average gradient descent direction calculated by the plurality of adjacent base stations.

Changing the time resource division vector includes calculating efficiencies of the first time division interval and the plurality of third division intervals using data rates of the user terminals of the first cell, receiving the efficiencies of the first time division interval and the plurality of third division intervals calculated by the plurality of adjacent base stations from the plurality of adjacent base stations, and changing the first time division interval and the plurality of third division intervals using the efficiencies of the first time division interval and the plurality of third division intervals calculated by the first base station and the plurality of adjacent base stations.

Changing the time resource division vector further includes transmitting the average gradient descent direction calculated by the first base station and the efficiencies of the first time division interval and the plurality of third division intervals to the plurality of adjacent base stations.

Changing the time resource division vector further includes transmitting the time resource division vector to the user terminals that belong to the first cell.

According to still another exemplary embodiment of the present invention, a dynamic resource allocating apparatus of a first base station that manages a first cell in a cellular communication system including the first cell and a plurality of cells adjacent to the first cell is provided. The dynamic resource allocating apparatus includes a controller and a transmitter. The controller determines time resource division vector that represent a first time division interval and a plurality of second time division intervals in accordance with distribution of user terminals of the first cell and the plurality of adjacent cells and a load level, allocates the first time division interval to user terminals positioned in centers of cells, allocates one of the plurality of second time division intervals to user terminals positioned at edges of the cells, sets up a first level of transmission power of the first base station in the allocated second time division interval to be no less than a second level of transmission power of adjacent base stations, and sets up a third level of transmission power of the first base station in the first time division interval to be no more than the first level and no less than the second level. The transmitter transmits information of the determined time resource division vector to at least one user terminal that belongs to the first cell.

The controller calculates achievable rate information of the user terminals of the first cell in the sub-channels of the first time division interval and the plurality of second time division intervals using the channel quality information received from the user terminals of the first cell, and selects user terminals in which the sub-channels are to be used in accordance with the achievable rate information of the user terminals of the first cell in the sub-channels.

The controller changes the time resource division vector using gradient descent directions of user utilities calculated by the user terminals of the first cell and the plurality of adjacent cells for the first time division interval and the plurality of second time division intervals and average efficiencies of the first time division interval and the plurality of second time division intervals calculated by the first cell and the plurality of adjacent cells. The user utilities include at least one of an objective function for maximizing throughput, an objective function for guaranteeing a minimum transmission speed, and an objective function in which a delay value is used as a performance ratio. The user utility values vary with distribution of the user terminals of the first cell and the plurality of adjacent cells and load levels of the first cell and the plurality of adjacent cells.

DETAILED DESCRIPTION OF THE EMBODIMENTS

Figure 1:
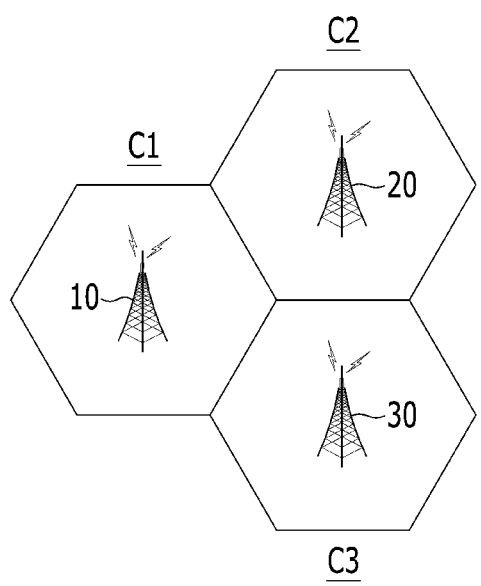
FIGS. 1 and 2 are views illustrating an example of a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, unless explicitly described to the contrary, the word "comprise" and variations such as "comprises" or "comprising" will be understood to imply the inclusion of stated elements but not the exclusion of any other elements.

A method and an apparatus for dynamically allocating resource according to an exemplary embodiment of the present invention will be described in detail with reference to the drawings.

Figure 2:
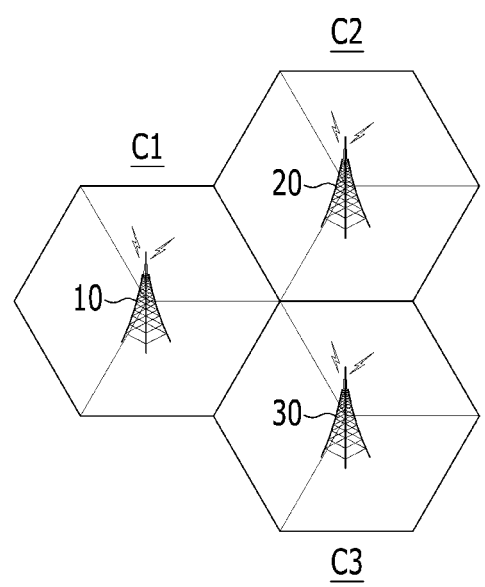

FIGS. 1 and 2 are views illustrating an example of a wireless communication system according to an exemplary embodiment of the present invention.

Referring to FIGS. 1 and 2, a wireless communication system includes a plurality of cells C1, C2, and C3. The cells C1, C2, and C3 include base stations 10, 20, and 30, respectively.

The base stations 10, 20, and 30 communicate with terminals in the cells C1, C2, and C3 using a radio resource.

At this time, the cells C1, C2, and C3 may be omni-cells as illustrated in FIG. 1, and may be three-sector cells each obtained by dividing a periphery of one base station into a plurality of, for example, three sectors, as illustrated in FIG. 2. In the sector structure illustrated in FIG. 2, sectors in the base stations 10, 20, and 30 are considered as cells. The dynamic resource allocating method according to the exemplary embodiment of the present invention may be applied to the sector structure.

In the wireless communication system including the plurality of cells C1, C2, and C3, a fractional frequency reuse (FFR) technique and a fractional time reuse (FTR) technique are used for removing inter-cell interference.

Figure 3:
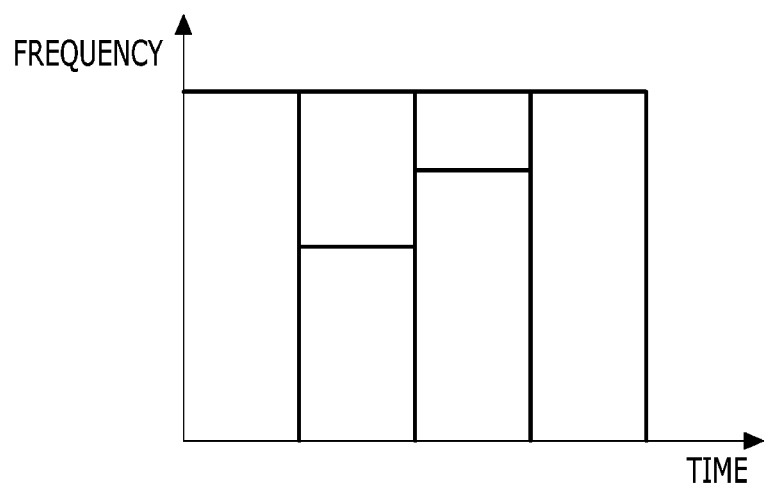
FIG. 3 is a view illustrating a radio resource structure according to an exemplary embodiment of the present invention.

FIG. 3 is a view illustrating a radio resource structure according to an exemplary embodiment of the present invention.

Referring to FIG. 3, radio resource may be defined as a two-dimensional region of time and frequency.

In the FFR technique, in the radio resource structure defined as the two-dimensional region of time and frequency, a frequency region is divided and a frequency resource is allocated to an adjacent cell to remove inter-cell interference. In the FTR technique, a time region is divided and a time resource is allocated to an adjacent cell to remove inter-cell interference.

In general, since the structure of an allocated resource is fixed in the FFR technique and the FTR technique, the FFR technique and the FTR technique are not adaptive to changes in intra-cell or inter-cell user distribution and a load level of a base station. Therefore, when the inter-cell user load distribution is not uniform, there are cells in which a resource is insufficient and cells in which a resource is not used but remains. In addition, when load distribution in a center region and that in a cell edge are not uniform in a cell, an allocated resource is not used or is insufficient so that a service is not properly performed. Therefore, it is necessary to provide a method of dynamically allocating a resource in accordance with changes in intra-cell or inter-cell user distribution and a load level of a base station.

Hereinafter, the dynamic resource allocating method according to the exemplary embodiment of the present invention will be described in detail based on the FTR technique in the omni-cell structure of FIG. 1.

Figure 4:
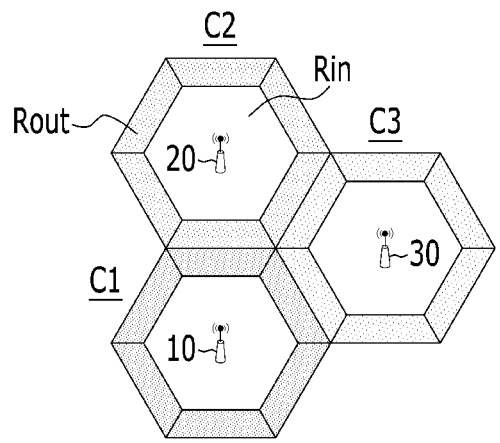
FIG. 4 is a view illustrating a dynamic resource allocating method according to an exemplary embodiment of the present invention.
Figure 4:
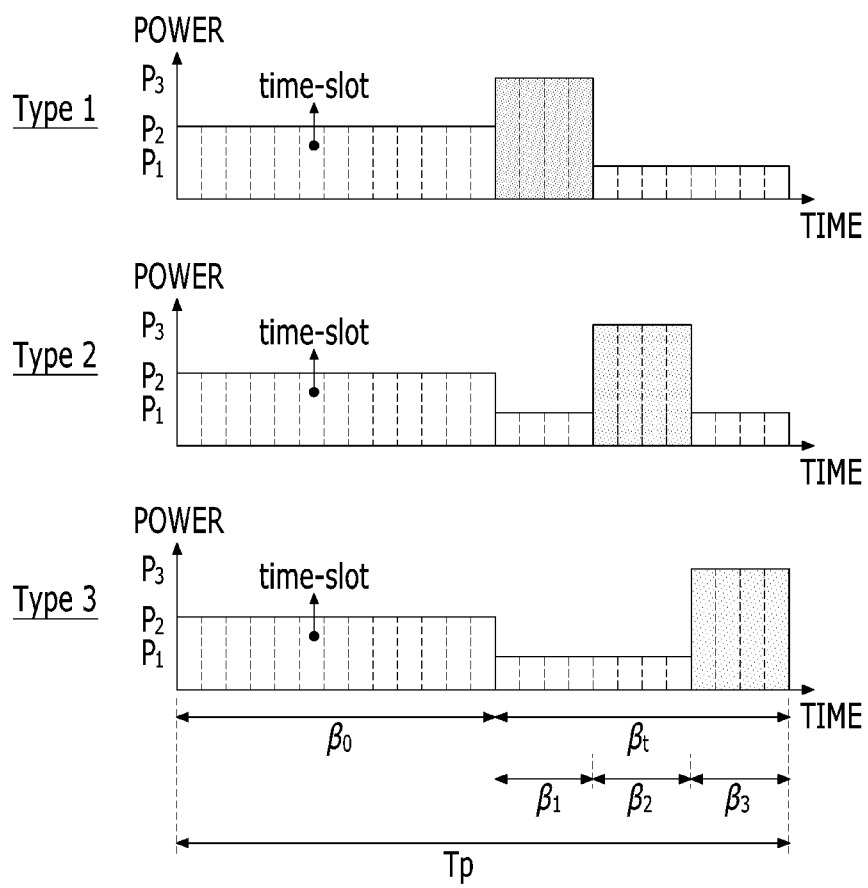

FIG. 4 is a view illustrating a dynamic resource allocating method according to an exemplary embodiment of the present invention.

Referring to FIG. 4, cells C1, C2, and C3 in a wireless communication system may have three cell types Type1, Type2, and Type3. At this time, it is assumed that the cell C1 has the cell type Type1, the cell C2 has the cell type Type2, and the cell C3 has the cell type Type3.

Time resource of a time resource division period Tp is divided into a first time division interval $\beta_0$ and a second time division interval $\beta_t$. Each of the first time division interval $\beta_0$ and the second time division interval $\beta_t$ includes a plurality of time slots. The second time division interval $\beta_t$ is divided into three time division intervals $\beta_1$, $\beta_2$, and $\beta_3$.

The first time division interval $\beta_0$ is allocated to serve user terminals positioned in center regions Rin of the cells C1, C2, and C3, and the plurality of time division intervals $\beta_1$, $\beta_2$, and $\beta_3$ of the second time division interval $\beta_t$ are exclusively allocated to serve user terminals positioned in the cell edges Rout of the cells C1, C2, and C3. At this time, the first time division interval $\beta_0$ is operated by a resource reuse coefficient 1 and the second time division interval $\beta_t$ is operated by a soft FTR technique that is a resource reuse coefficient 3.

Meanwhile transmission of another cell is not allowed in the respective division intervals $\beta_1$, $\beta_2$, and $\beta_3$ in a hard FTR technique, and transmission of high power to a cell to which a corresponding time division interval is allocated is allowed and transmission of low power to the other cells is allowed in the respective division intervals $\beta_1$, $\beta_2$, and $\beta_3$ in the soft FTR technique.

N is defined as a set of base stations, and a set of base stations that use the same level of transmission power in an allocated time resource is defined as $N_I$. In the omni-cells of FIG. 1, a set of base stations may be represented by Equation 1.

$$N = N_{I=0} \cup N_{I=1} \cup N_{I=2} \cup N_{I=3} \quad \text{(Equation 1)}$$

$N_{I=0} = \{1, 2, 3\}$
$N_{I=1} = \{1\}$
$N_{I=2} = \{2\}$
$N_{I=3} = \{3\}$

In the first time division interval $\beta_0$, all types of base stations serve user terminals in the cells using transmission power of a $P_2$ level. In the second time division interval $[\beta_I$ (I=\{1, 2, 3\})]$, base stations corresponding to $N_I$ serve user terminals positioned at cell edges using transmission power of the highest $P_3$ level. In the second time division interval $[\beta_I$ (I=\{1, 2, 3\})]$, base stations that do not have type I serve user terminals positioned in center regions using transmission power of a $P_1$ level.

A time resource division vector $\vec{\beta}$ that illustrates time resource division among the base stations 10, 20, and 30 in one time resource division period Tp may be represented as $\{\beta_0, \beta_1, \beta_2 \text{ and } \beta_3\}$, and has a relationship illustrated in Equation 2.

$$\beta_0 + (\beta_1 + \beta_2 + \beta_3) = T_p \quad \text{(Equation 2)}$$

At this time, division intervals $\beta_0$, $\beta_1$, $\beta_2$ and $\beta_3$ may be interleaved in a time axis under a condition that satisfies Equation 2 considering hybrid automatic transmit request (HARQ) and delay.

Figure 5:
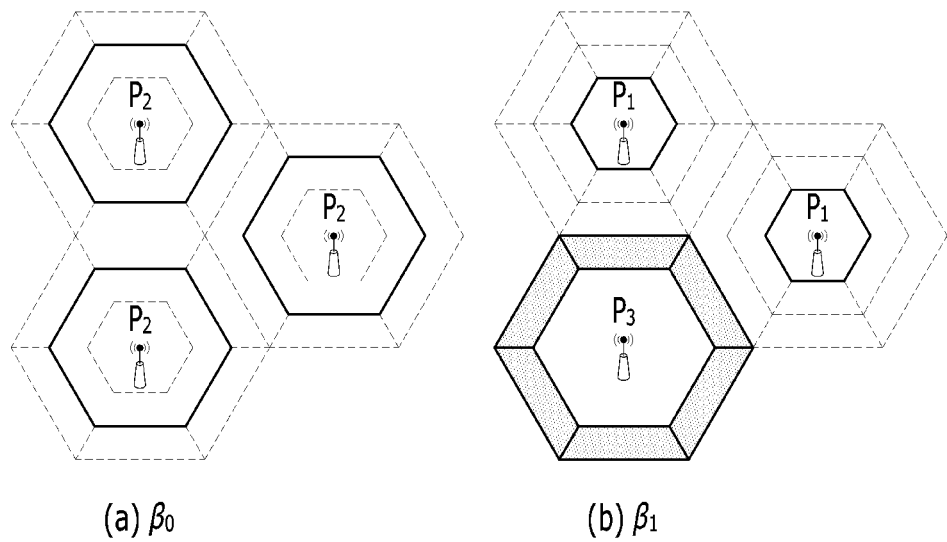
FIG. 5 is a view illustrating changes in coverage of target signal to interference plus noise ratio (SINR)-based cells in a time axis according to the resource allocating method illustrated in FIG. 4.
Figure 5:
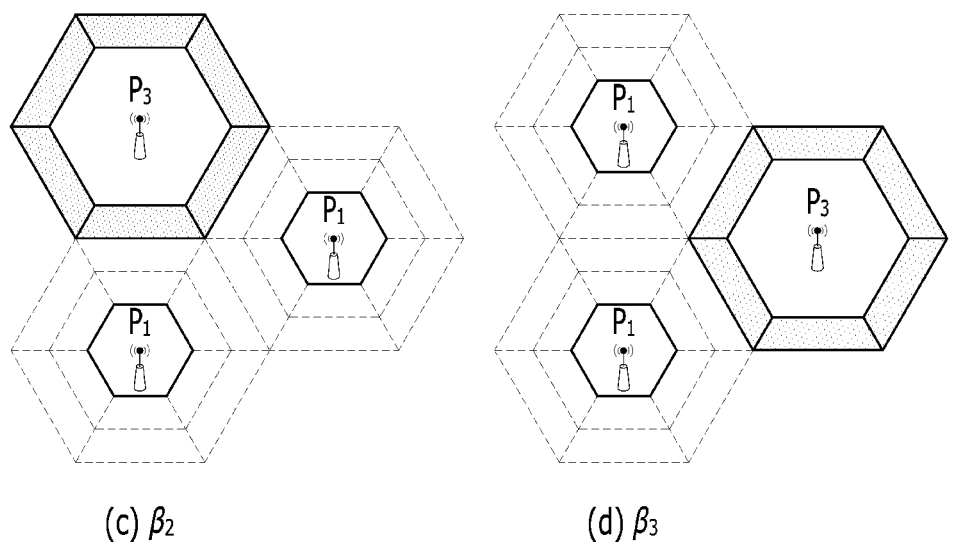

FIG. 5 is a view illustrating changes in coverage of target signal to interference plus noise ratio (SINR)-based cells in a time axis according to the resource allocating method illustrated in FIG. 4.

Referring to FIG. 5A, in the first time division interval $\beta_0$, all types of base stations serve user terminals positioned in center regions Rin of cells excluding cell edges of the cells using transmission power of a $P_2$ level. When distribution of user terminals positioned in the cell edges is low, a ratio of the first division interval $\beta_0$ may be increased to improve entire performance.

Referring to FIGS. 5B to 5D, in the second time division interval $[\beta_I$ (I=\{1, 2, 3\})]$, base stations of type I serve user terminals positioned in the cell edges Rout using transmission power of a $P_3$ level, and base stations that do not have the type I serve user terminals positioned in the center regions Rin using transmission power of a $P_1$ level. Since the transmission power of the type I base stations is increased and the transmission power of the base stations that do not have the type I is reduced, inter-cell interference in the cell edges of type I cells is reduced so that the SINR is increased.

As described above, SINR distribution of a cell varies with the type of a cell in the respective time resource intervals. Cell coverage in the respective time division intervals may be defined in accordance with the transmission power levels $P=\{P_1, P_2, P_3\}$ of the respective cells. Therefore, $P_1$ may be set up to generate interference of no more than a threshold value in a user terminal positioned in a cell edge Rout of an adjacent cell, and $P_2$ may be set up to provide an SINR of no less than the threshold value to a user terminal positioned in a center region Rin excluding a cell edge Rout of a serving cell. $P_3$ may be set up to provide an SINR of no less than the threshold value to the user terminal positioned in the cell edge Rout of the serving cell. Ratios of the transmission powers $P_1$, $P_2$, and $P_3$ of the respective base stations may be set up to be the same, and absolute magnitudes of the transmission powers $P_1$, $P_2$, and $P_3$ may be set up to be proportional to the maximum transmission power $P_{max}$ of the respective base stations.

That is, a transmission power level has a range illustrated in Equation 3.

$$0 \leq P_1 \leq P_2 \leq P_3 \leq P_{max} \quad \text{(Equation 3)}$$

Figure 6:
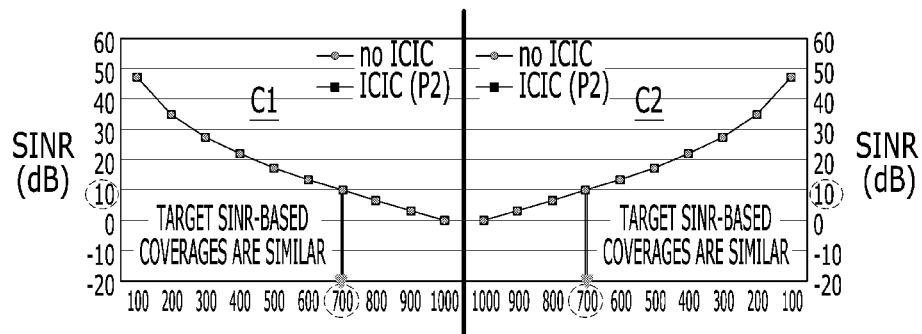
FIG. 6 is a view illustrating changes in intra-cell SINRs according to the time resource allocation illustrated in FIG. 4.
Figure 6:
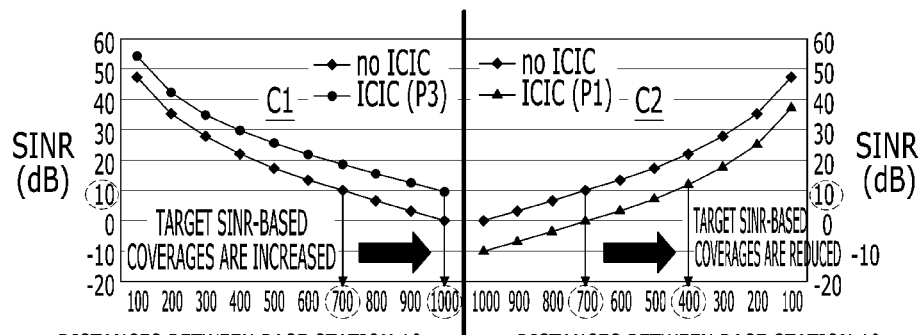
Figure 6:
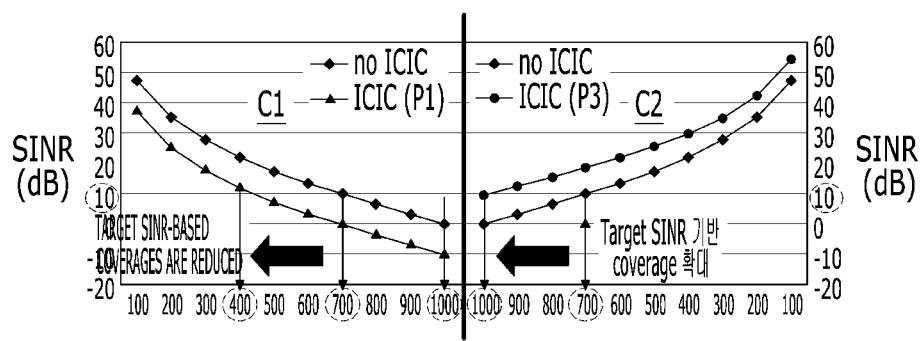

FIG. 6 is a view illustrating changes in inter-cell SINRs in accordance with the time resource division illustrated in FIG. 4. SINRs of the cells C1 and C2 illustrated in FIG. 1 are measured using a parameter defined in Table 1.

TABLE 1

| | Time resource division in accordance with an exemplary embodiment of the present invention | No ICIC |
|---|---|---|
| Carrier frequency | 2 GHz | |
| System bandwidth | 10 MHz | |
| TX Power | P = {P$_1$, P$_2$, P$_3$} = { 0.2, 10, 20} W | 20 W |
| Propagation loss model | 16.62 + 37.6 * log10(d[m]) | |
| Noise | −174 dBm/Hz | |
| Target SINR | 10 dBm | |
| Cell radius | 1000 m | |

Referring to FIG. 6A, in a time division interval $\beta_0$, SINRs in accordance with distances between base stations 10 and 20 and user terminals in the base stations 10 and 20 are similar when there is no inter-cell interference coordination (ICIC). Since interference from an adjacent cell is increased as transmission power of a serving cell is increased, a target SINR-based coverage in a case where the time resource division illustrated in FIG. 4 is applied is similar to that in a case of no ICIC.

However, referring to FIG. 6B, in a time division interval $\beta_1$, when the time resource division illustrated in FIG. 4 is applied, transmission power of the base station 10 is increased to $P_3$ and power transmission of the base station 20 is reduced to $P_1$. As a result, inter-cell interference is reduced in the cell C1 and the transmission power of the serving cell is increased so that the target SINR-based coverage is extended to a cell edge of the cell C1. On the other hand, inter-cell interference is increased in the cell C2 and the transmission power of the serving cell is reduced so that the target SINR-based coverage is reduced. As a result, the SINRs are increased by about 10 dBm at cell edges in comparison with those with no ICIC.

In addition, referring to FIG. 6C, in a time division interval $\beta_2$, when the time resource division illustrated in FIG. 4 is applied, as opposed to FIG. 6B, the transmission power of the base station 10 is reduced to $P_1$ and the transmission power of the base station 20 is increased to $P_3$. As a result, the target SINR-based coverage of the cell C1 is reduced and the target SINR-based coverage of the cell C2 is increased. As a result, the SINRs are increased by about 10 dBm in the cell edges in comparison with those with no ICIC.

As described above, the base stations of the cells C1, C2, and C3 according to the exemplary embodiment of the present invention separately operate time region resource in the time division interval $\beta_0$ where a resource reuse coefficient is 1 and in the time division intervals $[\beta_I (I=\{1, 2, 3\})]$ where a resource reuse coefficient is 3 for removing inter-cell interference among the base stations in order to improve performance of user terminals in the cell edges Rout of the cells, and the time region resource is dynamically and optimally divided in accordance with a network state, that is, user distribution and load states of the base stations, so that performance of an entire network may be optimally maintained.

For example, in an orthogonal frequency division multiplexing (OFDM) system such as a third generation partnership project long term evolution (3GPP LTE) and WiMAX, a channel quality indicator (CQI) value illustrating a channel state of a terminal is quantized in accordance with an SINR level.

In the case of the 3GPP LTE, as illustrated in Table 2, the maximum value of CQI indices is 15, modulation and coding schemes in accordance with the CQI values are defined, and data rates per real resource units are determined by the CQI values.

TABLE 2

| CQI index | Modulation | Coding rate x 1024 | Bits per resource element |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Figure 7:
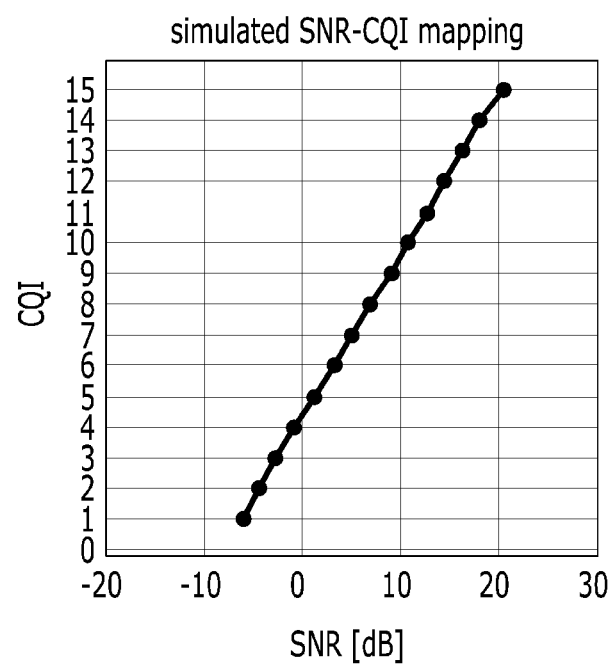
FIG. 7 is a view illustrating a mapping relationship between channel quality indicators (CQI) and signal to noise ratios (SNR) in a third generation partnership project (3GPP).
Figure 7:
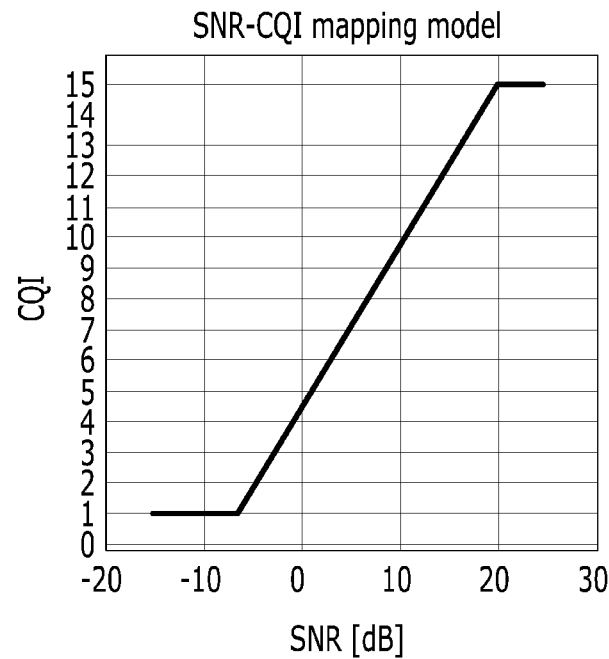

FIG. 7 is a view illustrating a mapping relationship between CQIs and signal to noise ratios (SNR) in a 3GPP.

Referring to FIG. 7, a user terminal reports the maximum CQI value, 15, to a base station when an SINR (or SNR) value is no less than 20 dBm based on requirement in which a block error rate (BLER) is no more than 10%. Therefore, when the base station operates the SINR of the user terminal so that marginal utility (a gain in comparison with resource investment) is maximized, network performance may be remarkably improved. That is, the marginal utility is increased up to the SINR of 20 dBm. However, the marginal utility is not further increased when the SINR is no less than 20 dBm. Therefore, the marginal utility is further increased when SINRs of user terminals positioned at cell edges Rout are increased from 0 dBm to 10 dBm than when SINRs of user terminals positioned in cell center regions Rin are increased from 20 dBm to 30 dBm.

For example, as illustrated in FIG. 6B, when the cell C2 serves a user terminal within a radius of 400 m and the cell C1 serves a user terminal within a radius of 1000 m including a cell edge, the marginal utility in the cell C1 may be maximized while minimizing a loss in the cell C2.

As illustrated in FIG. 6C, when the cell C1 serves a user terminal within a radius of 400 m and the cell C2 serves a user terminal within a radius of 1000 m including a cell edge, the marginal utility in the cell C2 may be maximized while minimizing the loss in the cell C1. As illustrated in FIG. 6A, when the cell C1 and the cell C2 serve a user within 700 m, the marginal utility may be maximized.

Since real SINR distribution varies with a frequency band and time due to shadowing and frequency selective fading in addition to a path loss, during intra-cell user scheduling, shadowing or frequency selective fading may also be reflected.

An optimized space for allocating a resource of a time region may be divided into frequency, time, and transmission power. A channel gain of a user terminal varies with frequency and time. Therefore, although the same transmission power is used, since a channel gain varies with a frequency band or scheduling time, a frequency selective gain may be obtained through frequency region scheduling.

The base stations 10, 20, and 30 of the cells C1, C2, and C3 according to the exemplary embodiment of the present invention perform dynamic resource allocation scheduling. The dynamic resource allocation scheduling means that the base stations cooperate with each other to perform the inter-cell time region resource division illustrated in FIG. 4 in a period of Tp, and to optimize time and transmission power resource and the base stations dispersively perform intra-cell user scheduling and frequency resource allocation in a scheduling period.

Now, the dynamic resource allocating method illustrated in FIG. 4 will be described in detail with reference to FIG. 8.

Figure 8:
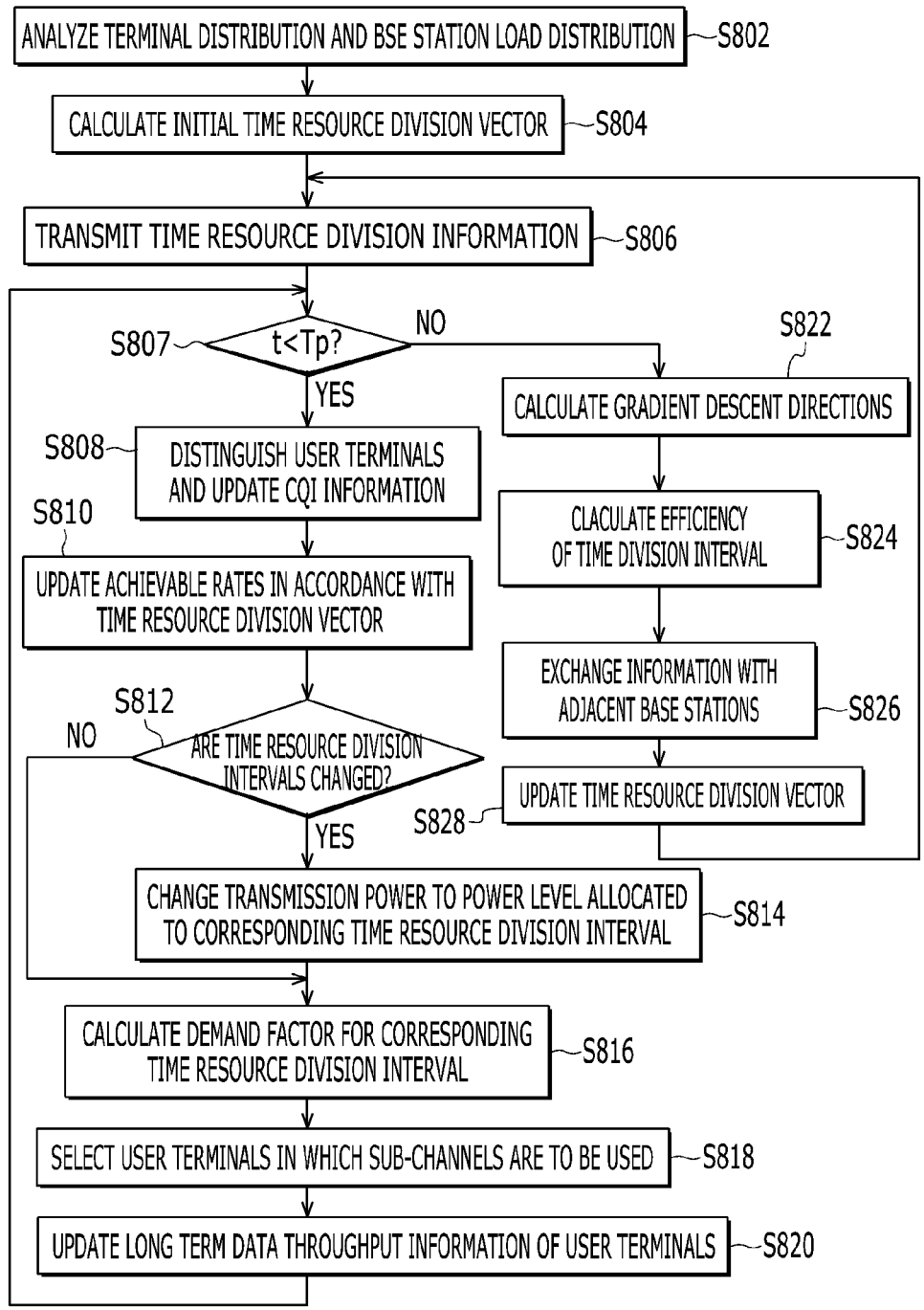
FIG. 8 is a flowchart illustrating a dynamic resource allocating method in a base station according to an exemplary embodiment of the present invention.

FIG. 8 is a flowchart illustrating a dynamic resource allocating method in a base station according to an exemplary embodiment of the present invention. In FIG. 8, for convenience sake, description will be made based on a base station (n).

Referring to FIG. 8, a base station (n) analyzes user terminal distribution and load distribution of the base station (n) (S802), and calculates an initial time resource division vector based on the analysis result (S804). The base station 10 may receive time resource division information including time resource division vectors of adjacent cells to calculate the initial time resource division vector. At this time, although not shown in the drawing, an interface exists between adjacent base stations (cells) so that information transmission between the base stations is supported. The interface may correspond to an X2 interface in LTE.

As described above, time resource division vector $\vec{\beta}$ in one time resource division period Tp may be represented as $\{\beta_0, \beta_1, \beta_2 \text{ and } \beta_3\}$ and, in the respective time division intervals, as illustrated in FIG. 4, transmission power is allocated to a user terminal.

For example, it is assumed that a bandwidth of an entire system is defined as B (Hz), a base station set is defined as $N=\{1, \ldots, N\}$, user set is defined as $K=\{1, \ldots, K\}$, and a sub-channel set is defined as $S=\{1, \ldots, S\}$. In addition, a user set that belongs to the base station (n) is defined as $K_n=\{1, \ldots, K_n\} \subset K$, and a base station set that belongs to type I cells is defined as $N_I \subset N$(ex: $N_{I=1}=\{1\}$, $N_{I=2}=\{2\}$, $N_{I=3}=\{3\}$.

When a time slot $(t) \in [0, \beta_0]$ and the base station $(n) \in N$, all of the base stations perform transmission with $P_2^n$ level transmission power. When a time slot $(t) \in [\Sigma_{i=0}^{I-1} \beta_i, \Sigma_{i=0}^{I} \beta_i]$ and the base station $(n) \in N_I$, all of the base stations perform transmission with $P_3^n$ level transmission power in a case where the base station (n) has the type I and perform transmission with $P_1^n$ level transmission power in a case where the base station (n) does not have the type I.

In the time slot (t), when transmission power in sub-channels (s) of the base station (n) is defined as $p_s^n(t)$, $p_s^n(t)$ may be represented by Equation 4.

$$p_s^n(t) = \begin{cases} P_2^n/S, & \text{time slot } t \in \beta_0 \text{ and } n \in N \\ P_3^n/S, & \text{time slot } t \in \beta_I \text{ and } n \in N_I \\ P_1^n/S, & \text{time slot } t \in \beta_I \text{ and } n \notin N_I \end{cases} \quad \text{(Equation 4)}$$

SINRs in the sub-channels (s) between user terminals (k) of the base station (n) may be represented by Equation 5.

$$SINR_{k,s}^n(t) = \frac{p_s^n(t)G_{k,s}^n(t)}{\sigma_{k,s}^n + \sum_{j=1, j \neq n}^{N} p_s^j(t)G_{k,s}^j(t)} \quad \text{(Equation 5)}$$

Here, $SINR_{k,s}^n(t)$ represents an SINR in the sub-channels (s) between the user terminals (k) of the base station (n), $G_{k,s}^n(t)$ represents a channel gain in the sub-channels (s) between the base station (n) and the user terminals (k), and $\sigma_{k,s}^n$ represents noise power of the sub-channels (s).

The base station (n) may define maximization of long term network wide utility of a system as an objective function of the dynamic resource allocating method as illustrated in Equation 6. That is, when the cells maximize utility of user terminals that belong thereto, utility of the entire network may be maximized.

$$(P): \max U = \sum_{n \in N} U^{(n)} \quad \text{(Equation 6)}$$
$$= \sum_{\substack{k \in \mathcal{K} \\ \text{subject to } R \in \mathcal{R}}} U_k(R_K)$$
$$= \sum_{n \in N} \sum_{k \in \mathcal{K}_n} U_k(R_k)$$

In Equation 6, $R_k$(k∈K) means a long term data throughput vector for the user terminals (k), and $R_k$(k∈K) may be represented by Equation 7.

(Equation 7)

$$R_k(t) = \Sigma_{\tau=1}^{t} \Sigma_{s \in S} I_{k,s}^n(\tau) \cdot r_{k,s}^n(\tau)$$

In Equation 7, $r_k^n(t)$ means a data rate allocated to the user terminals (k) of the base station (n) in the time slot (t) and may be represented by Equation 8.

$$r_k^n(t) = \Sigma_{s \in S} I_{k,s}^n(t) \cdot r_{k,s}^n(t), \forall k \in K, n \in N \quad \text{(Equation 8)}$$

Here, $I_{k,s}^n(t)$ represents a user scheduling vector in the sub-channels (s) of the user terminals (k) of the base station (n) in the time slot (t). $r_{k,s}^n(t)$ means an instantaneous achievable rate in the sub-channels (s) of the user terminals (k) of the base station (n) in the time slot (t), and may be represented by Equation 9.

$$r_{k,s}^n(t) = \frac{B}{S} \cdot \log_2(1 + \lambda SINR_{k,s}^n(t)) \quad \text{(Equation 9)}$$

Equation 9 is a theoretical value and the instantaneous achievable rate is determined by a CQI-based modulation and coding scheme in a real system, as illustrated in Table 2. Therefore, in LTE, the instantaneous achievable rate may be quantized in WiMAX or a next standard specification, as illustrated in Table 2. User scheduling vectors in all of the base stations may be represented by Equation 10.

$$I(t) = [I_{k,s}^n(t) = \{0,1\} : k \in K, n \in N, s \in S] \quad \text{(Equation 10)}$$

In Equation 6, a generalized (ω, α)-fair utility function illustrated in Equation 11 may be used as utility of user terminals.

(Equation 11)

$$U_k(R_k) = \begin{cases} \omega_k \log R_k, & \text{if } \alpha = 1, \\ \omega_k (1-\alpha)^{-1} R_k^{1-\alpha}, & \text{otherwise} \end{cases}$$

At this time, when (ω, α)=1 and 0, a throughput maximization utility function in which order of priorities of all user terminals are the same is used, and when (ω, α)=1 and 1, a proportional fairness utility function in which the order of priorities of all the user terminals are the same is used. When (ω, α)=(1, ∞), a max-min fairness utility function in which the order of priorities of all the user terminals are the same may be used.

$\omega_k$ represents order of priorities of user terminals. In general, user classes are commonly determined by a rate system, and the order of priorities for share of resource varies. α as a positive real number is a fairness factor among the user terminals. When the α is 0, a resource is allocated only to user terminals in which a channel state is good. As the α is increased, a resource may be fairly distributed. In general, the proportional fairness utility function is mainly used. however, the α may vary with an operation method of an operator.

The objective function of the base station (n) is not limited to Equation 6. For example, an objective function including the minimum transmission speed guarantee or an objective function in which a delay value is used as a performance ratio may be applied to the base station (n).

Solving Equation 6 involves dividing an optimal time resource among base stations every time slot and determining user scheduling in the base stations. Simultaneously, solving Equation 6 involves finding an optimal inter-cell time resource division vector β*(t) and an intra-cell user scheduling vector I*(t).

When a stochastic gradient technique is used, the base station (n) selects β*(t) and I*(t) that maximize Equation 12 every time slot to maximize a network utility.

$$(P): \max_{\beta,I} U(\beta,I) = \Sigma_{k \in K} \nabla U_k(R_k(t-1)) \omega k \quad \Sigma_{s \in S} I_{k,s}^n \\ (t) \cdot r_{k,s}^n(t) \quad \text{(Equation 12)}$$

In Equation 12, in order to obtain optimal β*(t) and I*(t), achievable rate information of user terminals in the respective time division intervals [β*(t)] is required. The achievable rate information may be obtained by the user terminals measuring intensities of a received signal in the time division intervals.

After the initial time resource division vector is calculated or when the time resource division vector is changed, the base station (n) transmits the time resource division information including the time resource division vector $\vec{\beta}$ to the user terminals (S806).

When a current time slot (t) corresponds to a current time resource division period Tp (S807), the base station (n) distinguishes the user terminals from terminals positioned in cell center regions and terminals positioned at cell edges based on CQI information of the user terminals for the respective time division intervals, and updates the CQI information (S808). The user terminals may periodically transmit the CQI information to the base station (n) or may transmit the CQI information to the base station (n) when CQI values are changed.

At this time, in the user terminals positioned in the cell edges, a change in the CQI values is large in the respective time division intervals of the time resource division vector $\vec{\beta}$, and the base station (n) serves the user terminals in a corresponding interval considering the above. The base station (n) updates the achievable rates [$r_{k,s}^n(t)$] of the user terminals in the time resource division vector $\vec{\beta}$ (S810). At this time, the achievable rates $[r_{k,s}{}^n(t)]$ of the user terminals in the time resource division vector $\vec{\beta}$ may be updated only when the CQI information is received from the user terminals.

When the time division intervals are changed in the time slot (t) (S812), the base station (n) changes transmission power allocated in a corresponding time division interval and serves the user terminals (S814).

Next, the base station (n) calculates demand factors $[d_{k,s}{}^n(l)]$ of the user terminals in a current time division interval based on the achievable rates $[r_{k,s}{}^n(t)]$ in accordance with the time resource division vector $\vec{\beta}$ (S816). $d_{k,s}{}^n(l)$ represents demand factors of the user terminals (k) of the base station (n) in the time division intervals $[\beta_I (I=\{0, 1, 2, 3\})]$, and may be calculated by Equation 13.

$$d_{k,s}^n(l) = \frac{r_{k,s}^n(t, l)}{r_{k,s}^n(t, l=0)} \quad \text{(Equation 13)}$$

Here, $r_{k,s}{}^n(t,l)$ represents the instantaneous achievable rates $[r_{k,s}{}^n(t)]$ of the user terminals (k) of the base station (n) in the time division intervals $[\beta_I (I=\{1, 2, 3\})]$.

In the base stations that belong to the type I cells, a magnitude of $d_{k,s}{}^n(l)$ is in the order of the user terminals positioned in the cell edges that are severely interfered with by adjacent cells.

The base station (n) performs inter-cell user scheduling on provided $\beta_I$ every time slot (t) based on $d_{k,s}{}^n(l)$ to select user terminals for which sub-channels are to be used as illustrated in Equation 14 (S818). At this time, the user scheduling is performed every sub-channel in the time slot (t).

$$k_s^n(t) = \underset{k \in \mathcal{K}_n}{\mathrm{argmax}} \; d_{k,s}^n(l) \cdot \nabla U_k^n(R_k^n(t-1)) \cdot r_{k,s}^n(t), \quad \text{(Equation 14)}$$

$$\forall n \in \mathcal{N}, s \in \mathcal{S}$$

$$t \in \left[ \sum_{i=0}^{l-1} \beta_i, \sum_{i=0}^{l} \beta_i \right].$$

As described above, after performing the user scheduling, the base station (n) updates long term data throughput $$\left[ R_k(t), R_k^l(t) = \frac{1}{t} \sum_{\tau=1}^{t} \sum_{s \in \mathcal{S}} I_{k,s}^n(\tau) \cdot r_{k,s}^n(\tau, l) \right]$$

information of a user set of the base station (n) in the period Tp S820.

On the other hand, when the current time slot (t) does not correspond to the current time resource division period Tp (S807), the base station (n) updates the time resource division vector $\vec{\beta}$.

To be specific, in order to calculate the time resource division vector $\vec{\beta}$ that maximize the utility of the user terminals, the base station (n) calculates gradient descent directions $\Delta\beta_I{}^n$ user utilities by user terminals represented by Equation 6. The gradient descent directions $\Delta\beta_I{}^n$ for $\beta_I$ of the time resource division vector may be calculated as illustrated in Equation 15.

$$\Delta \beta_l^n = \sum_{k \in \mathcal{K}_n} \frac{\partial U_k^n(R_k^n(t))}{\partial \beta_l} \quad \text{(Equation 15)}$$

Next, the base station (n) receives the gradient descent directions $\Delta\beta_I{}^n$ for $\beta_I$ from an adjacent base station, and calculates an average gradient descent direction using the gradient descent directions $\Delta\beta_I{}^n$ for $\beta_I$ calculated by the base station (n) and gradient descent directions $\Delta\beta_I{}^n$ for $\beta_I$ received from an adjacent base station (S822). The average gradient descent direction of $\beta_I$ of the time resource division vector may be calculated as illustrated in Equation 16.

$$\Delta \beta_l = \sum_{n \in N} \Delta \beta_l^n \quad \text{(Equation 16)}$$

Here, since $R_k{}^n(t)$ is a function of the time resource division vector $\vec{\beta}$, $R_k{}^n(t)$ may be calculated using a chain rule. When $R_k{}^n(t)$ is replaced by $R_k{}^n(\beta_l)$ for $t\in[\sum_{i=0}^{l-1}\beta_i, \sum_{i=0}^{l}\beta_i]$, $R_k{}^n(t)$ may be represented by Equation 17.

$$\frac{\partial U_k^n(R_k^n(t))}{\partial \beta_l} = \frac{\partial U_k^n(R_k^n(\beta_1))}{\partial R_k^n(\beta_1)} \frac{\partial R_k^n(\beta_1)}{\partial \beta_1} \quad \text{(Equation 17)}$$

The base station (n) updates the time resource division vector in the calculated gradient descent directions as illustrated in Equation 18.

$$\beta_l \leftarrow \beta_l + \gamma \Delta \beta_l \quad \text{(Equation 18)}$$

Another rule for determining the time resource division vector may be set up in terms of efficiency that is a data rate in comparison with set-up time. That is, more time may be allocated to a time interval having higher efficiency than average efficiency so that entire efficiency may be improved.

The base station (n) calculates components of the time resource division vector, that is, efficiency of the time division intervals (S824). The efficiency of the time division intervals may be represented by Equation 19.

$$e_l^n = \frac{R_k^n(\beta_l)}{\beta_l} \quad \text{(Equation 19)}$$

$$e_l = \sum_{n \in N} e_l^n$$

The average efficiency may be represented by Equation 20.

$$m^n = \frac{\sum_{i=0}^{l} R_k^n(\beta_i)}{\sum_{i=0}^{l} \beta_i} \quad \text{(Equation 20)}$$

$$m = \sum_{n \in N} m^n$$

Therefore, when efficiency is emphasized, the time resource division vector may be updated by Equation 21.

$$\beta_l \leftarrow \beta_l \frac{e_l}{m} \quad \text{(Equation 21)}$$

The base station (n) transmits information such as the calculated gradient descent directions $\Delta\beta_l^n$, efficiencies $e_l^n$ of the time division intervals, and an average efficiency $m^n$ to an adjacent base station, and receives corresponding information from an adjacent base station (S826).

When Equation 18 and Equation 21 are blended, a final time resource division vector as illustrated in Equation 22.

$$\beta_l \leftarrow \beta_l + \gamma \Delta\beta_l + \gamma_e\left(\frac{e_l}{m} - 1\right)\beta_l \quad \text{(Equation 22)}$$

Here, $\gamma_e$ is a parameter for controlling an update speed of the time resource division vector using efficiency. When $\gamma$ is not 0, the time resource division vector updated by Equation 22 are finally normalized.

The base station (n) updates the time resource division vector by the time resource division vector obtained by Equation 22 (S828).

Figure 9:
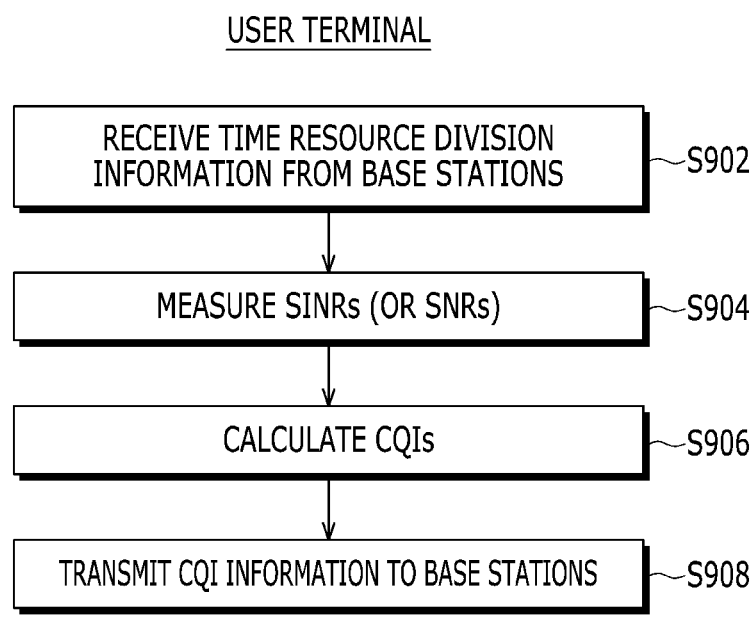
FIG. 9 is a flowchart illustrating a method of user terminals reporting CQI information according to an exemplary embodiment of the present invention.

FIG. 9 is a flowchart illustrating a method of user terminals reporting CQI information according to an exemplary embodiment of the present invention.

Referring to FIG. 9, user terminals receive time resource division information including time resource division vector from the base station (n) (S902).

The user terminals measure a reference signal transmitted by the base station (n) in the respective time division intervals of the time resource division vector to measure an SINR (or SNR) of an entire band and/or SINRs (or SNRs) of sub-channels S904, and calculate a CQI of the entire band and/or CQIs of the sub-channels based on the SINR of the entire band and/or the SINRs of the sub-channels (S906).

The user terminals transmit the calculated entire band CQI and/or sub-channel CQIs to the base station (n) (S908). The user terminals may transmit the calculated wideband CQI and/or sub-channel CQIs to the base station (n) only when the calculated entire band CQI and/or sub-channel CQIs are changed.

The base station (n) distinguishes the user terminals using the CQI information received from the user terminals and updates the CQI information of the user terminals.

Figure 10:
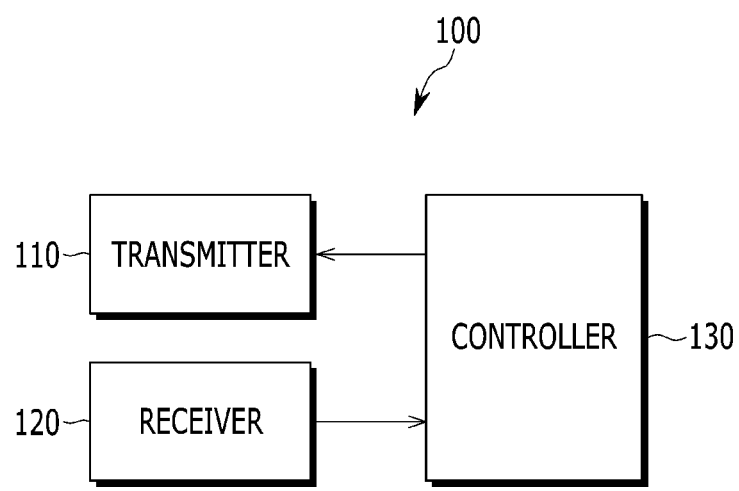
FIG. 10 is a view illustrating a dynamic resource allocating apparatus of a base station according to an exemplary embodiment of the present invention.

FIG. 10 is a view illustrating a dynamic resource allocating apparatus of a base station according to an exemplary embodiment of the present invention.

Referring to FIG. 10, a dynamic resource allocating apparatus 100 of the base station (n) includes a transmitter 110, a receiver 120, and a controller 130.

The transmitter 110 and the receiver 120 perform communications with an adjacent base station. The transmitter 110 transmits information to the adjacent base station and the receiver 120 receives information from the adjacent base station. Here, the information may include the above-described gradient descent direction, time division interval efficiencies, and average efficiency. In addition, the transmitter 110 transmits resource allocation information to user terminals that belong to the base station (n). The resource allocation information may include the above-described time resource division vector.

The controller 130 performs an entire operation for the dynamic resource allocation described with reference to FIG. 8. Particularly, the controller 130 divides a time resource of the time resource division period Tp into a first time division interval and a second time division interval, divides the second time division interval into a plurality of division intervals, allocates the first time division interval in order to serve the user terminals positioned in the cell center regions Rin, and allocates one of the plurality of division intervals in order to serve the user terminals positioned in the cell edges Rout. In addition, the controller 130 calculates time resource division vector and user scheduling vectors that represent the first time division interval and the plurality of division intervals so that the utility of the user terminals may be maximized in a set-up objective function, and updates the time resource division vector.

According to the exemplary embodiment of the present invention, a frequency resource, a time resource, and transmission power are efficiently used in accordance with a network state, that is, user distribution and a load station of base stations, through inter-cell cooperation so that inter-cell interference may be controlled and performance of user terminals at cell edges may be improved. In addition, in accordance with the network state, marginal utility of limited frequency, time, and transmission power resources are maximized so that users in a cell may feel that quality is improved.

Since intra-cell user selection and frequency resource allocation may be dispersively performed every scheduling period, an inter-cell time resource and transmission power optimizing period may be adaptively controlled based on inter-cell cooperation, and only processed information is exchanged, it is possible to reduce overhead of information exchanges among base stations and complexity of calculation and to increase a frequency region multi-user gain in comparison with a conventional FFR. It is possible to reduce transmission power without reducing performance in comparison with a resource reuse 1 system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of allocating a time resource by a dynamic resource allocating apparatus of a first base station that manages a first cell in a cellular communication system including the first cell and a plurality of cells adjacent to the first cell, comprising:

dividing time resource of one period into a first time division interval and a second time division interval and dividing the second time division interval into a plurality of third division intervals;

setting up a first level of transmission power in cells to which corresponding third division intervals are allocated to be no less than a second level of transmission power in other cells in the third division intervals;

determining time resource division vector that represent the first time division interval and the plurality of third division intervals; and changing the time resource division vector in accordance with distribution of user terminals of the first cell and the plurality of adjacent cells and load levels of the first cell and the plurality of adjacent cells after the one period.

2. The method of claim 1, further comprising:

the first base station and a plurality of adjacent base stations that manage the plurality of adjacent cells serving user terminals positioned in centers of cells in the first time division interval; and the first base station and the plurality of adjacent base stations serving user terminals positioned at edges of the cells in the allocated third division intervals, wherein the plurality of first cells and the plurality of adjacent cells are divided into a plurality of cell types and the plurality of third division intervals are allocated to base stations of the plurality of cell types.

3. The method of claim 2, wherein setting up a first level of transmission power in cells to which corresponding third division intervals are allocated to be no less than a second level of transmission power in other cells in the third division intervals comprises setting up a third level of transmission power in the plurality of cells to be no more than the first level and no less than the second level in the first time division interval.

4. The method of claim 2, further comprising:
selecting user terminals of the first cell in which sub-channels are to be used in the one period.

5. The method of claim 4, wherein
selecting user terminals of the first cell in which sub-channels are to be used in the one period comprises:
calculating an achievable rate of the user terminals of the first cell in the sub-channels of the first time division interval and the plurality of third division intervals; and
selecting user terminals in which the sub-channels are to be used in accordance with the achievable rate of the user terminals of the first cell calculated by the sub-channels.

6. The method of claim 5, wherein
calculating the achievable rate comprises:
receiving channel quality information from the user terminals of the first cell; and
calculating the achievable rate information based on the channel quality information received from the user terminals of the first cell.

7. The method of claim 2, wherein
in changing the time resource division vector, an objective function that maximizes user utilities of the user terminals of the first cell is used,
wherein the user utility values vary with the distribution of user terminals of the first cell and the plurality of adjacent cells and the load levels of the first cell and the plurality of adjacent cells.

8. The method of claim 7, wherein the objective function comprises at least one of an objective function for minimizing data throughput, an objective function for guaranteeing a minimum transmission speed, and an objective function in which a delay value is used as a performance ratio.

9. The method of claim 2, wherein
changing the time resource division vector comprises:
calculating an average gradient descent direction of the user utilities of the user terminals of the first cell for the first time division interval and the plurality of third division intervals;
receiving average gradient descent directions of the user utilities calculated by the plurality of adjacent base stations for the first time division interval and the plurality of third division intervals from the plurality of adjacent base stations, respectively; and
changing the first time division interval and the plurality of third division intervals using the average gradient descent direction calculated by the first base station and the average gradient descent directions calculated by the plurality of adjacent base stations.

10. The method of claim 9, wherein
changing the time resource division vector comprises:
calculating efficiencies of the first time division interval and the plurality of third division intervals using data rates of the user terminals of the first cell;
receiving the efficiencies of the first time division interval and the plurality of third division intervals calculated by the plurality of adjacent base stations from the plurality of adjacent base stations; and
changing the first time division interval and the plurality of third division intervals using the efficiencies of the first time division interval and the plurality of third division intervals calculated by the first base station and the plurality of adjacent base stations.

11. The method of claim 10, wherein changing the time resource division vector further comprises transmitting the average gradient descent direction calculated by the first base station and the efficiencies of the first time division interval and the plurality of third division intervals to the plurality of adjacent base stations.

12. The method of claim 2, wherein changing the time resource division vector further comprises transmitting the time resource division vector to the user terminals that belong to the first cell.

* * * * *